United States Patent
Konopacki et al.

(10) Patent No.: US 12,136,781 B1
(45) Date of Patent: Nov. 5, 2024

(54) PROTECTIVE CAP FOR ELECTRICAL PLUG

(71) Applicants: Matthew James Konopacki, Tavernier, FL (US); Michael P. Hajec, Key Largo, FL (US)

(72) Inventors: Matthew James Konopacki, Tavernier, FL (US); Michael P. Hajec, Key Largo, FL (US)

( * ) Notice: Subject to any disclaimer, the term of this patent is extended or adjusted under 35 U.S.C. 154(b) by 400 days.

(21) Appl. No.: 17/395,198

(22) Filed: Aug. 5, 2021

Related U.S. Application Data

(60) Provisional application No. 63/061,394, filed on Aug. 5, 2020.

(51) Int. Cl.
  *H01R 13/44* (2006.01)
  *C08L 27/18* (2006.01)
  *C08L 71/02* (2006.01)
  *C08L 77/02* (2006.01)
  *H01R 13/443* (2006.01)

(52) U.S. Cl.
  CPC ........... *H01R 13/443* (2013.01); *C08L 27/18* (2013.01); *C08L 71/02* (2013.01); *C08L 77/02* (2013.01)

(58) Field of Classification Search
  CPC .................................................... H01R 13/443
  USPC ........................................ 439/148, 149, 134
  See application file for complete search history.

(56) References Cited

U.S. PATENT DOCUMENTS

| | | | | |
|---|---|---|---|---|
| 2,861,250 A | * | 11/1958 | Elwell | H01J 5/50 439/150 |
| 3,182,280 A | * | 5/1965 | Daut | H01R 13/443 439/378 |
| 3,519,977 A | * | 7/1970 | Swearingen | H01R 13/53 439/588 |
| 4,259,970 A | * | 4/1981 | Green, Jr. | A24F 47/00 131/185 |
| 5,338,213 A | * | 8/1994 | Oko | H01R 13/443 174/138 F |
| 5,599,196 A | | 2/1997 | Powell et al. | |
| 5,911,598 A | | 6/1999 | Pawlenko | |
| 6,220,885 B1 | | 4/2001 | Lemberger et al. | |
| 6,273,729 B1 | * | 8/2001 | Kelly | B60R 16/0207 439/36 |
| 6,773,277 B2 | | 8/2004 | Issa | |
| 7,497,705 B2 | | 3/2009 | Larson et al. | |
| 8,608,492 B2 | | 12/2013 | Cananzi et al. | |
| 9,526,818 B2 | | 12/2016 | Kearsley et al. | |
| 9,698,532 B2 | | 7/2017 | Peckham | |
| 9,812,814 B1 | | 11/2017 | Borkar et al. | |
| 2002/0058433 A1 | * | 5/2002 | O'Malley | H01R 13/443 439/148 |
| 2003/0124900 A1 | | 7/2003 | O'Malley | |

* cited by examiner

*Primary Examiner* — Phuong K Dinh
(74) *Attorney, Agent, or Firm* — MALLOY & MALLOY, PL

(57) ABSTRACT

The present invention is directed toward a protective cap with grease fitting that is designed and configured to cover an electrical plug such that the prongs of the plug do not corrode when the plug is not in use. The protective cap may include a housing with an exterior wall and an interior wall, a plurality of grooves within the housing, and a self-lubricating plastic that encases the grooves within the housing.

19 Claims, 4 Drawing Sheets

PROTECTIVE CAP FOR ELECTRICAL PLUG

CROSS-REFERENCE TO RELATED APPLICATIONS

This application claims the benefit of U.S. Provisional Patent Application No. 63/061,394, filed on Aug. 5, 2020, which is incorporated by reference herein in its entirety.

FIELD OF THE INVENTION

The present invention relates generally to an apparatus and method for preserving metal prongs of electrical plugs. More particularly, the present invention relates to a protective cap comprised of a self-lubricating plastic which encases the metal prongs of an electrical when the plug is not in use.

BACKGROUND OF THE INVENTION

A connector is a coupling device that joins electrical transmissions to create an electrical circuit. Connectors for power plugs and receptacles used for AC mains electricity in North America and other countries that use the standards set by the National Electrical Manufacturers Association (NEMA) are known as NEMA connectors. NEMA wiring devices are made in current ratings from 15 to 60 amperes (A), with voltage ratings from 125 to 600 volts (V). Different combinations of contact blade widths, shapes, orientation, and dimensions create non-interchangeable connectors that are unique for each combination of voltage, electric current carrying capacity, and grounding system. A common type of NEMA connector are twist-locking connectors.

Twist-locking connectors were first invented by Harvey Hubbell III in 1938 and "Twist-Lock" remains a registered trademark of Hubbell Incorporated, although the term is used generically to refer to NEMA locking connectors manufactured by any company. Locking connectors use curved blades. While a normal three-prong outlet can simply be pushed or pulled to connect with a standard wall outlet, to add a layer of protection to this process, a twist lock receptacle requires that it be twisted in order to connect properly. The male connector usually has curved prongs that plug into the receptacle and then are twisted to lock into place. To unplug, the plug must be twisted the opposite direction. Without this process the electrical device cannot be disconnected from the wall.

Locking connectors come in a variety of standardized configurations and are designed so that different voltages and current ratings cannot be accidentally intermated. Many specific types exist; only a few are listed below. Other types include special purpose connectors for boats, 400 Hz circuits such as used for aircraft, and high voltage machinery.

A twist lock is beneficial in those environments where the electrical equipment is critical to operations, is semi-permanent, and should not be easily unplugged. Weather-resistant twist locks can be useful when the receptacle is exposed to the elements. It can prevent water from entering the connection and causing electrical surges. The twist lock creates a tight connection and seal. The plug will not become loose and create exposure of the prongs and receptacle holes.

One apparent disadvantage of twist-lock connectors is that in the event that the cable is accidentally pulled too hard, rather than the plug falling out of the receptacle, exposed conductors may come out of the plug, causing dangerous shorts or shock hazards if the circuit is live. This is resolved in most cases by the connector having a robust integral strain relief. Another major common disadvantage of twist-lock connectors is their tendency to rust and corrode when not in use. This can lead to the prongs breaking.

Accordingly, there remains a need in the art for a solution to at least one of the aforementioned problems. For instance, a preservation device is desired by which the prongs of a twist-locking connector would not corrode. Additionally, a preservation device is desired by which the prongs of the connector are not expose to adverse weather elements when the connector is not plugged in.

SUMMARY OF THE INVENTION

The present invention is directed to protective cap for an electrical plug. The cap includes a plurality grooves designed to accept prongs from an electrical plug while the plug is not in use. Additionally, the protective cap further includes a self-lubricating plastic which encases the plurality of grooves to keep the prongs from corroding. A method for using the protective cap is also provided.

The protective cap may solve a number of problems currently associated with the use of twist-locking connectors. Firstly, the protective cap utilizes a self-lubricating plastic to preserve the metallic prongs of an electrical plug and protect the prongs from rusting or corrosion. Secondly, the cap also protects the plug from being exposed to adverse weather conditions when not in use, aiding in diminishing the risk of electric shock when the plug is eventually plugged into an outlet. This is critical because the cap may be used to protect plugs of boat lifts and other heavy machinery that may remain outdoors at all times. Lastly, the protective cap is designed to prolong the overall life of the plug such that the connector need not be replaced as frequently.

In a first implementation of the invention, a protective cap comprises:
  a housing having an exterior wall and an interior wall;
  a plurality of grooves within the housing, the plurality of grooves being designed and configured to accept prongs of an electrical plug; and
  a self-lubricating plastic, the self-lubricating plastic encasing the plurality of grooves within the housing.

In a second aspect, the housing may be cylindrical.

In another aspect, the exterior wall may include a plurality of ridges.

In another aspect, the exterior wall may be sized and configured to match the size of a connector that is to be inserted in to the protective cap.

In another aspect, the interior wall may be smooth.

In another aspect, the housing may be comprised of a sturdy, rigid material.

In another aspect, the housing may be comprised of a flexible, pliant material.

In another aspect, the housing may be designed and configured to receive and hold the self-lubricating plastic.

In another aspect, the plurality of grooves may be two or more.

In another aspect, the plurality of grooves may be curved.

In another aspect, the plurality of grooves may be straight.

In another aspect, the plurality of grooves may be circular.

In another aspect, the self-lubricating plastic may be Delrin®.

In another aspect, the self-lubricating plastic may be Teflon®.

In another aspect, the self-lubricating plastic may be Nylon®.

In another aspect, the self-lubricating plastic may be designed and configured to keep prongs of a plug from corroding.

In another implementation of the invention, a method of using the protective cap comprises:
- obtaining a protective cap, the protective cap having a housing with an exterior wall and an interior wall, a plurality of grooves within the housing, the plurality of grooves being designed and configured to accept prongs of an electrical plug, and a self-lubricating plastic, the self-lubricating plastic encasing the plurality of grooves within the housing;
- turning off an electrical outlet;
- removing the prongs of the electrical plug from the electrical outlet;
- enabling a user to hold the protective cap from the exterior wall in a first hand;
- enabling the user to hold a connector of the electrical plug;
- having the user insert the prongs of the electrical plug in to the grooves of the protective cap;
- having the user let go of the protective cap upon inserting the prongs in to the cap;
- and enabling the user to remove the prongs of the plug from the protective cap once the plug is needed for use;
- In another aspect, the user may twist the electrical plug when removing from the outlet or from the protective cap.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a protective cap with that is designed and configured to cover an electrical plug such that the prongs of the plug do not corrode when the plug is not in use. The protective cap may include a housing with an exterior wall and an interior wall, a plurality of grooves within the housing, and a self-lubricating plastic that encases the grooves within the housing. The plurality of grooves are designed and configured to receive the prongs on an electrical plug. The protective cap operates by having the self-lubricating plastic prevent the grooves from corroding. This process not only prevents the prongs on an electrical plug from breaking, but could also help in limiting the incidences of electric shock.

Figure 1:
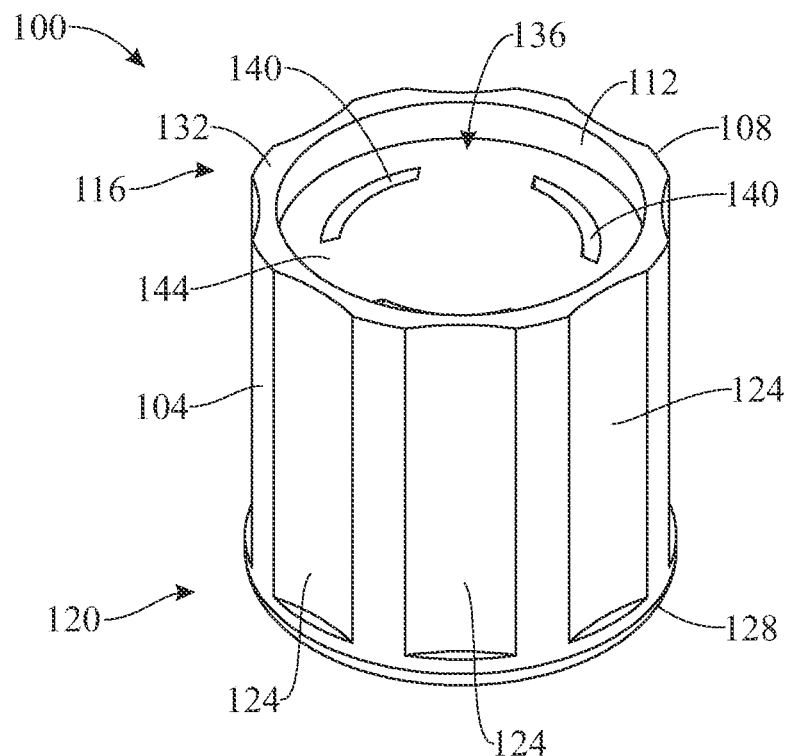
FIG. 1 presents an isometric view of a protective cap in accordance with a first illustrative embodiment of the invention.

Referring initially to FIG. 1, a protective cap 100 for an electrical plug is illustrated in accordance with an exemplary embodiment of the present invention. As shown, the protective cap 100 has a top or proximal end 116 and a bottom or distal end 120. The protective cap 100 further includes a housing 104 and a plurality of grooves 140 encased in a self-lubricating plastic 144. The protective cap 100 may also include a plurality of ridges 124 along the housing 104. Preferably, the housing 104 is made of a rigid, study, and insulative material, such as, but not limited to, polyvinyl chloride or high density polyethylene. Alternatively, the housing 104 may be of a flexible, pliant material. The protective cap 100 is designed and configured such that the prongs of a plug are preserved from corroding or breaking when inserted into the plurality of grooves 140 of the protective cap 100.

Figure 2:
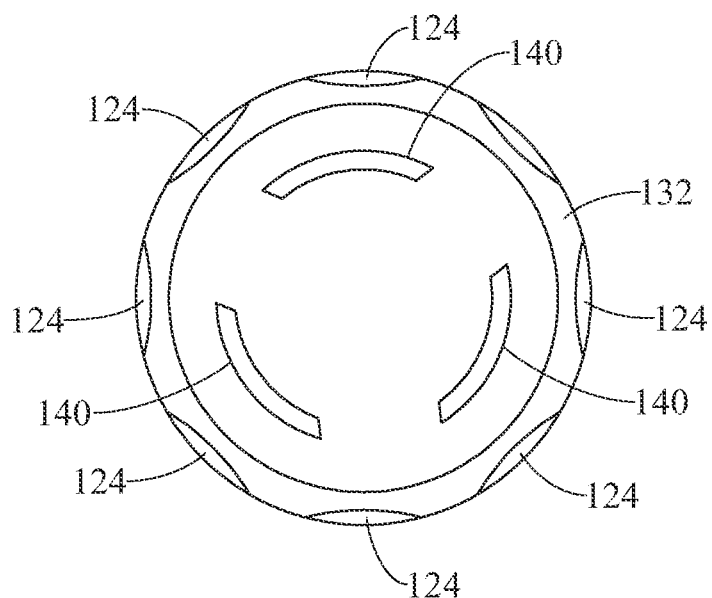
FIG. 2 presents a top, cross-sectional view of the protective cap illustrated in FIG. 1.
Figure 3:
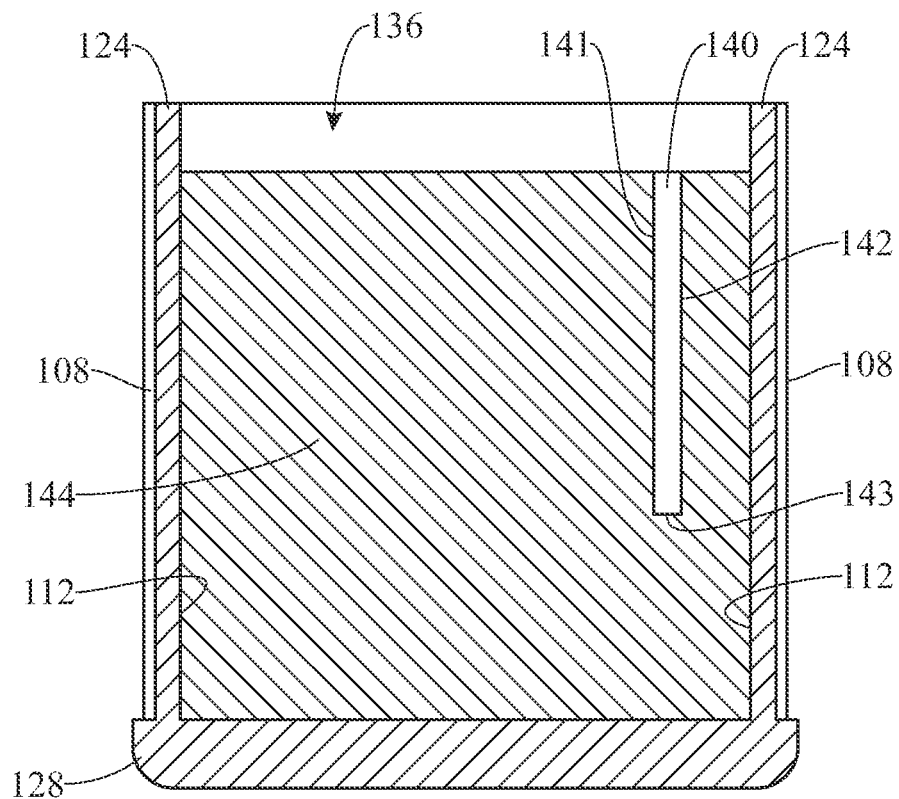
FIG. 3 presents a side, cross-sectional view of the protective cap illustrated in FIG. 1.

With continued reference to FIG. 1, the housing 104 includes an exterior wall 108 and an interior wall 112. Additionally, at the proximal end 116 of the protective cap 100, the housing 104 includes a top side, edge, or wall 132, as shown in FIGS. 1 and 2. At the distal end of the protective cap 100, the housing 104 further includes a bottom side, end, or wall 128, as shown in FIGS. 1 and 3. The bottom wall 128 may have a diameter that is slightly larger than the diameter of the top wall 132. The bottom wall 128 may also be thicker than the top wall 128 or the exterior wall 108 or interior wall 112, as best shown in FIG. 3. Referring back to FIG. 1, the bottom wall 128 and the top wall 132 are connected to each other by the exterior wall 108 and interior wall 112 of the housing 104. The top wall 132 may be hollow, forming an opening 136 with the exterior wall 108 and the interior wall 112. The housing 104 as a whole may be cylindrical in shape. Alternatively, the housing 104 may be any shape capable of receiving prongs of an electrical plug, as will be discussed in greater detail hereinafter. Running vertically along the exterior wall 108 from the proximal end 116 to the distal end 120 of the protective cap 100 may be a plurality of ridges 124. The plurality of ridges 124 may be indeterminately spaced some distance away from each other around the full circumference of the exterior wall 108. The plurality of ridges 124 may also have some indeterminate depth and width, such that the surface of the plurality of ridges 124 is depressed in comparison to the surface of the exterior wall 124. Additionally, the plurality of ridges 124 may cut in to the surface of the top wall 132 such that the top wall 132 may not be circular, as shown in FIG. 2.

Referring back to FIG. 1, the housing contains a self-lubricating plastic 144. The self-lubricating plastic 144 is sized to fit within the housing 104. The self-lubricating plastic 144 extends from the bottom wall 128 to some indeterminate distance just below the top wall 132, as best shown in FIG. 3. The indeterminate distance between the self-lubricating plastic 144 and the top wall 132 further defines the aforementioned opening 136. Additionally, the self-lubricating plastic 144 encompasses the entire horizontal distance of the housing 104 such that the self-lubricating plastic contacts with the entire interior wall 112. The self-lubricating plastic 144 may be comprised of Delrin®. Alternatively, the self-lubricating plastic 144 may be comprised of Teflon® or Nylon®.

Contained within the self-lubricating plastic 144 may be a plurality of grooves 140, as best shown in FIG. 2. As best shown in FIG. 3, the plurality of grooves 140 each have a first side wall 141 and a second side wall 142. The first side wall 141 and the second side wall 142 may be parallel to each other and are connected to each other by a bottom wall 143. The width and depth of the plurality of grooves 140 may vary, but they are designed and structured to fit the prongs on an electrical plug, as will be described in greater detail hereinafter. The plurality of grooves 140 may be two or more. The plurality of grooves 140 may be curved, as best shown in FIGS. 1 and 2. Alternatively, the plurality of grooves 140 may be straight, or circular, or any dimension reasonably necessary to fit a corresponding electrical plug prong. The self-lubricating plastic 144 may exhibit properties such that the self-lubricating plastic 144 may prevent the prongs of an electrical plug from rusting, corroding, or breaking.

Figure 4:
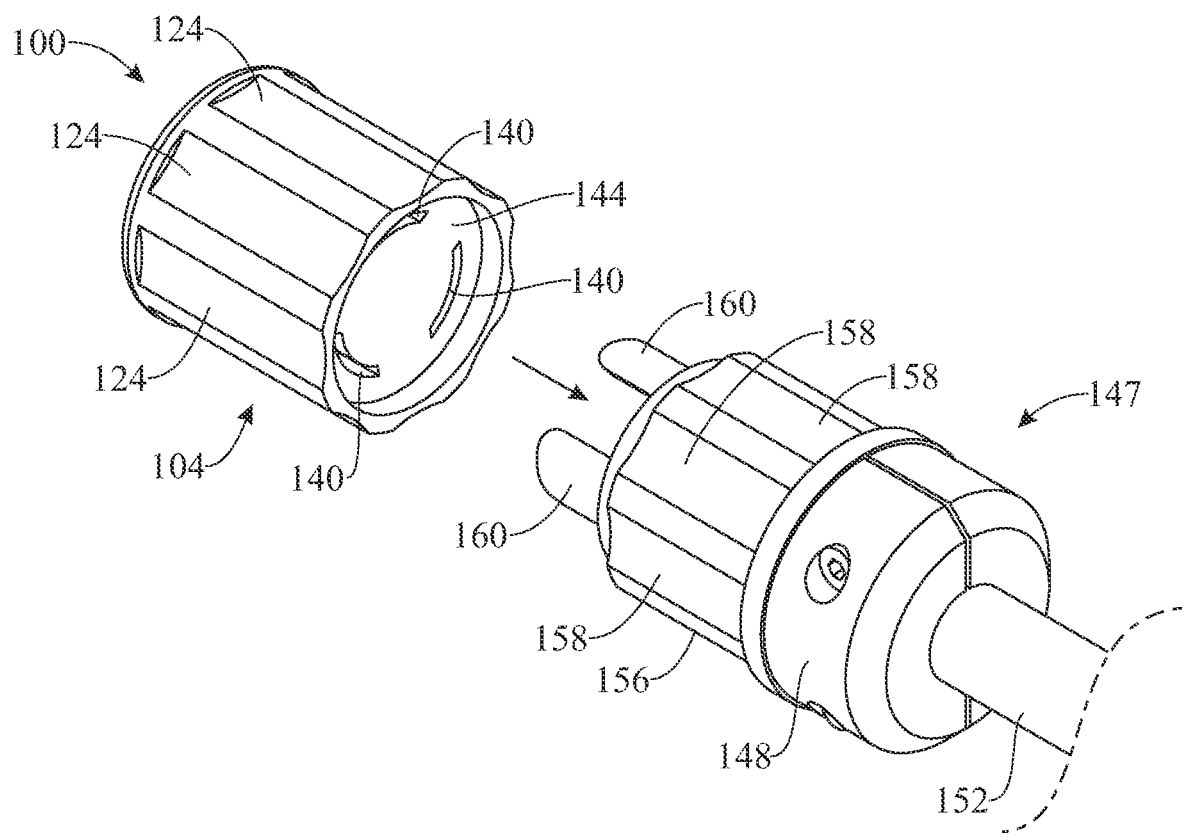
FIG. 4 presents a side, perspective view of protective cap illustrated in FIG. 1, prior to engaging with a connector of an electrical plug.
Figure 5:
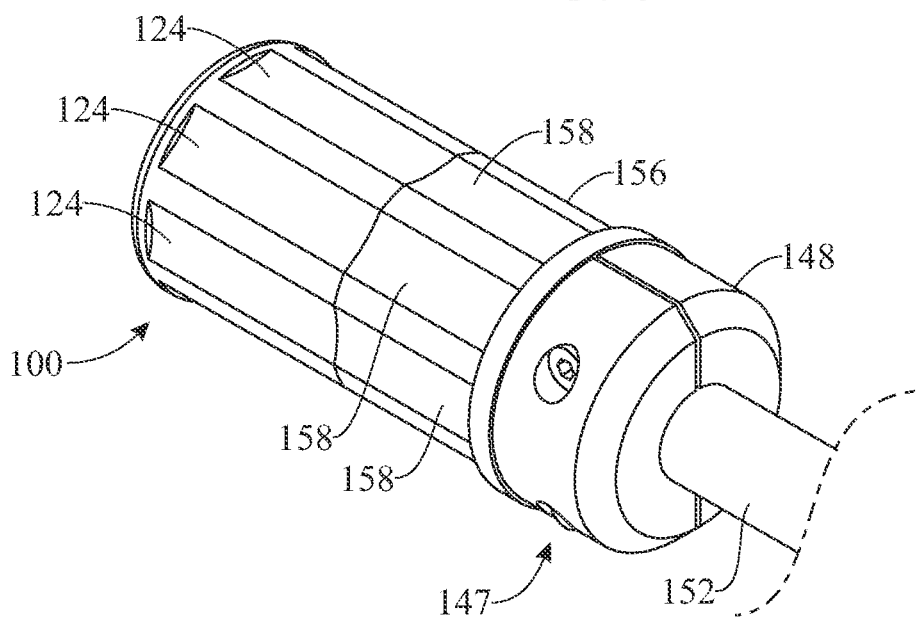
FIG. 5 presents a side, perspective view of protective cap illustrated in FIG. 4, after engaging with a connector of an electrical plug.
Figure 6:
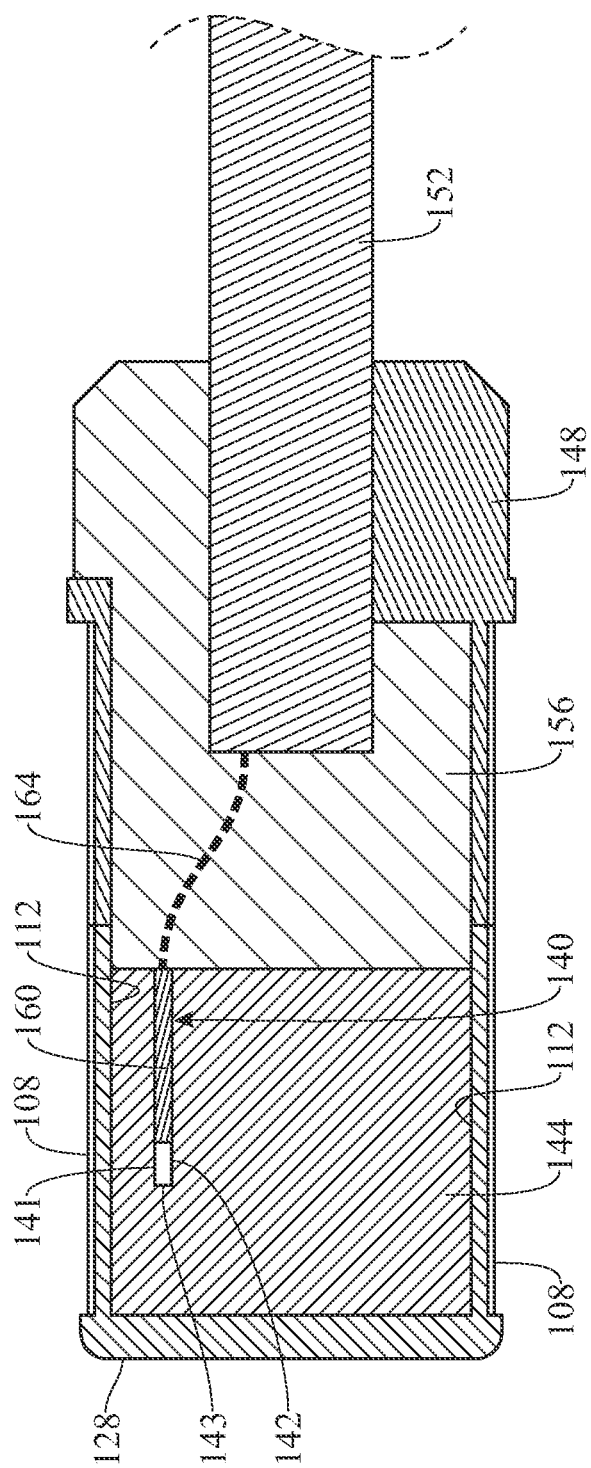
FIG. 6 presents side, inverted cross-sectional view of the protective cap illustrated in FIG. 5, after engaging with a connector of an electrical plug.

The illustration of FIGS. 4-6 demonstrate an example method of operation of the protective cap 100. As shown in FIG. 4, an electrical plug 147 to be placed in to the protective cap 100 is procured. The electrical plug 147 may have a connector 148 attached to a cord 152. Also attached to the connector 148 may be an electrical housing 156. The electrical housing 156 may comprise a plurality of ridges 158. Preferably, the plurality of ridges 158 of the electrical housing 156 match the plurality of ridges 124 on the exterior wall 108 of the housing 104 of the protective cap 100, for reasons to mentioned in greater detail hereinafter. Additionally, the electrical housing 156 may further include all of the internal wiring 164 of the electrical plug 147, as shown in FIG. 6. The internal wiring 164 may connect to a plurality of prongs 160 which may be affixed to the electrical housing 156, as shown in FIG. 4 and FIG. 6. The plurality of prongs 160 may be comprised of a metal, so as to act as a conductor of electricity. Additionally, the plurality of prongs 160 may be curved. Alternatively, the plurality of prongs 160 may be flat. Preferably, plurality of prongs 160 match the general shape of the plurality of grooves 140 of the protective cap 100. The plurality of prongs 160 may also have a length and a width similar to, but not greater than the plurality of grooves 140 of the protective cap 100. This allows the plurality of prongs 160 to easily engage in the plurality of grooves 140 of the protective cap 100 to protect them from corrosion or rusting.

Upon procurement of the electrical plug 147 to be placed within the protective cap 100, the electrical plug 147 is ready to first be removed from any outlet into which it is plugged into. A user may first ensure that the outlet is not turned or is not active prior to removing the electrical plug 147. If the outlet is turned on, a user may turn off the outlet prior to unplugging the electrical plug 147. This may reduce the risk of electrical shock to the user. Depending on the type of electrical plug 147, a user may have to twist the connector 148 or the electrical housing 156 to get the plurality of prongs 160 to disengage from the electrical outlet. Upon unplugging the electrical plug 147 from the outlet, the plurality of prongs 160 may be ready to engage with the plurality of grooves 140 of protective cap 100. The user may begin by holding the electrical plug 147 from either the connector 148 or the electrical housing 156 in one hand. At the same time, the user may hold protective cap 100 by the housing 104 in the other hand. Preferably, the user holds the protective cap 100 such that the distal end 116 faces outward, and the opening 136 is in line with the electrical housing 156. At this point, the user may begin to align the electrical plug 147 and the protective cap 100 so that they may be engaged. The user may use the plurality of ridges 124 on the exterior wall 108 of the housing 104 of the electrical cap 100 and the plurality of ridges 158 on the electrical housing 156 to ensure alignment. More specifically, the plurality of ridges 124, 158 on both the electrical cap 100 and the electrical plug 147 should line up. Once the plurality of ridges 124, 158 are lined up, the plurality of prongs 160 are in a position to engage with the plurality of grooves 160 of the protective cap. A user may attach the protective cap 100 by placing the plurality of prongs 160 of the electrical plug 147 into the plurality of grooves 160 of the protective cap 100. The first side wall 141 and the second wide wall 142 of the plurality of grooves 140 should be tightly in contact with the plurality of electrical prongs 160 such that the prongs sit against the sidewalls 141, 142 and do not fall out. Preferably, some force would be required to pull the plurality of prongs 160 out of the plurality of grooves 148. Similar to how plastic bearings are used on metal surfaces, the self-lubricating plastic 144 within the housing 104 of the protective cap 100 may limit the corrosive properties of the plurality of prongs 160 of the electrical plugs 147 which tend to be metallic. As mentioned previously, the self-lubricating plastic 144 may be Delrin® due to its anti-corrosive and chemically resistant properties. Alternatively, the self-lubricating plastic 144 may be Nylon® or Teflon®.

Upon engagement of the protective cap 100 with the electrical plug 147, the exterior wall 108 of the housing 104 of the protective cap 100 is preferably flush with the electrical housing 156 of the electrical plug 147. As mentioned previously, this is evident when the plurality of ridges 124, 158 on both the electrical cap 100 and the electrical plug 147 line up. Not only may this feature provide a better aesthetic appearance, but it also serves as an indicator of when the protective cap 100 and the electrical plug 147 are properly attached. Additionally, the plurality of ridges 124, 158 provides a varied texture that may give the user better grip when detaching the electrical plug 147 from the protective cap 100.

Alternative embodiments are contemplated to those shown or described herein without departing from the scope of the present disclosure. For example, embodiments are contemplated in which the walls of the plurality of grooves contain a locking mechanism in order to further secure the prongs of the electrical plug into the protective cap, to prevent them from falling out. Another alternative embodiment considered is making the self-lubricating plastic piece of the protective cap removable from the housing. This would allow the user to change the piece such that different electrical plug configurations could be supported by the protective cap without having to procure a new cap altogether.

In summary, the protective cap disclosed herein provides a user with the ability to protect and cover the prongs of an electrical plug, limiting the rusting and corrosion that often occur with electrical plug prongs. This is achieved by immersing the plug into a self-lubricating plastic contained in the housing of the protective cap. Additionally, because the protective cap protects the electrical plug from adverse weather conditions, in the case of machinery that is left outside.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A protective cap comprising:
   a housing having an exterior wall and an interior wall;
   a plurality of grooves within the housing, the plurality of grooves being designed and configured to accept prongs of an electrical plug; and
   a self-lubricating plastic sized to fit within the housing, the self-lubricating plastic extending from a bottom wall of the housing to some indeterminate distance just below a top wall of the housing, the self-lubricating plastic further extending the entire horizontal distance of the housing such that the self-lubricating plastic encases the plurality of grooves within the housing.

2. The protective cap of claim 1, wherein the housing is cylindrical.

3. The protective cap of claim 1, wherein the housing is comprised of a sturdy, rigid material.

4. The protective cap of claim 1, wherein the housing is comprised of a flexible, pliant material.

5. The protective cap of claim 1, wherein the bottom wall has a diameter greater than the top wall.

6. The protective cap of claim 1, wherein the exterior wall includes a plurality of ridges.

7. The protective cap of claim 6, wherein the plurality of ridges are spaced an indeterminate distance from each other around the full circumference of the exterior wall.

8. The protective cap of claim 6, wherein the plurality of ridges are depressed in comparison to a surface of the exterior wall.

9. The protective cap of claim 6, wherein the plurality of ridges are configured to provide grip to a user and to serve as an indicator of a plug or connector alignment within the protective cap.

10. The protective cap of claim 6, wherein the exterior wall is sized and configured to match the size of a plug or connector that is to be inserted in to the protective cap.

11. The protective cap of claim 1, wherein the housing is configured to receive and hold the self-lubricating plastic.

12. The protective cap of claim 1, wherein the plurality of grooves is two or more.

13. The protective cap of claim 1, wherein the plurality of grooves are at least one of curved, straight, and circular shaped.

14. The protective cap of claim 5, wherein the self-lubricating plastic extends from the bottom wall to some indeterminate distance below the top wall.

15. The protective cap of claim 14, wherein the indeterminate distance between the self-lubricating plastic and the top wall define an opening.

16. The protective cap of claim 1, the self-lubricating plastic is comprised of at least of at least one of Delrin®, Teflon®, and Nylon®.

17. The protective cap of claim 1, wherein the self-lubricating plastic is configured to keep prongs of a plug from corroding.

18. A protective cap comprising:
   a housing having an exterior wall and an interior wall and a top and bottom wall, wherein the bottom wall has a diameter greater than the top wall;
   a plurality of grooves within the housing, wherein the plurality of grooves are designed and configured to accept prongs of an electrical plug, and further wherein the plurality of grooves are at least one of curved, straight, or circular shaped; and
   a self-lubricating plastic sized to fit within the housing, the self-lubricating plastic extending from a bottom wall of the housing to some indeterminate distance just below a top wall of the housing, the self-lubricating plastic further extending the entire horizontal distance of the housing such that the self-lubricating plastic encases the plurality of grooves within the housing and being configured to keep prongs of the plug from corroding.

19. A protective cap comprising:
   a housing having an exterior wall and an interior wall and a top and bottom wall, wherein the bottom wall has a diameter greater than the top wall;
   a plurality of grooves within the housing, wherein the plurality of grooves are designed and configured to accept prongs of an electrical plug and further wherein, the plurality of grooves are at least one of curved, straight, or circular shaped; and
   a self-lubricating plastic extending from the bottom wall to some indeterminate distance below the top wall, wherein the self-lubricating plastic extends the entire horizontal distance of the housing such that the self-lubricating plastic encases the plurality of grooves within the housing and is configured to keep prongs of the plug from corroding, and further wherein the indeterminate distance defines an opening configured to receive the plug.

* * * * *